United States Patent
Mueller et al.

[15] 3,698,787
[45] Oct. 17, 1972

[54] HOLOGRAM SYNTHESIS USING A DISPLACEABLE REFERENCE POINT SOURCE

[72] Inventors: Rolf K. Mueller, Brighton, Mich.; Emanuel Marom, Tel Aviv, Israel

[73] Assignee: The Bendix Corporation

[22] Filed: Feb. 19, 1971

[21] Appl. No.: 116,983

[52] U.S. Cl. .................................350/3.5, 350/96 B
[51] Int. Cl. ...........................................G02b 27/22
[58] Field of Search .............350/3.5; 355/2; 340/5 H

[56] References Cited

UNITED STATES PATENTS

| | | |
|---|---|---|
| 3,537,854 | 11/1970 | Grobin et al.................350/3.5 |
| 3,598,484 | 8/1971 | Redman et al..............350/3.5 |
| 3,516,721 | 6/1970 | Collier et al................350/3.5 |
| 3,518,367 | 6/1970 | Smith..........................350/3.5 |
| 3,580,656 | 5/1971 | Carson .......................350/3.5 |
| 3,580,655 | 5/1971 | Leith et al. .................350/3.5 |

OTHER PUBLICATIONS

Stroke et al., Proc. of the IEEE, Vol. 55, No. 1, January 1967, pp. 109–111.
Mikaeliane et al., IEEE Jour. of Quantum Electronics, Vol. QE–4, No. 11, November 1968, pp. 757–762.

*Primary Examiner*—David Schonberg
*Assistant Examiner*—Ronald J. Stern
*Attorney*—William F. Thornton and Plante, Hartz, Smith & Thompson

[57] ABSTRACT

A photographic record of a hologram that will produce a three-dimensional image when illuminated with a beam of coherent laser radiation is produced synthetically by directing coherent laser light from two point sources to interfere proximate a recording film. The interference pattern produced depends on the relative positions of the two point sources. Both sources are moved according to a predetermined program to a number of different positions, with one source constrained to move in a single plane and the other along a line normal to this plane. The various interference patterns are superimposed on the recording film to form a complex hologram. The method and apparatus of this invention can be used to create images of real as well as fanciful scenes.

25 Claims, 4 Drawing Figures

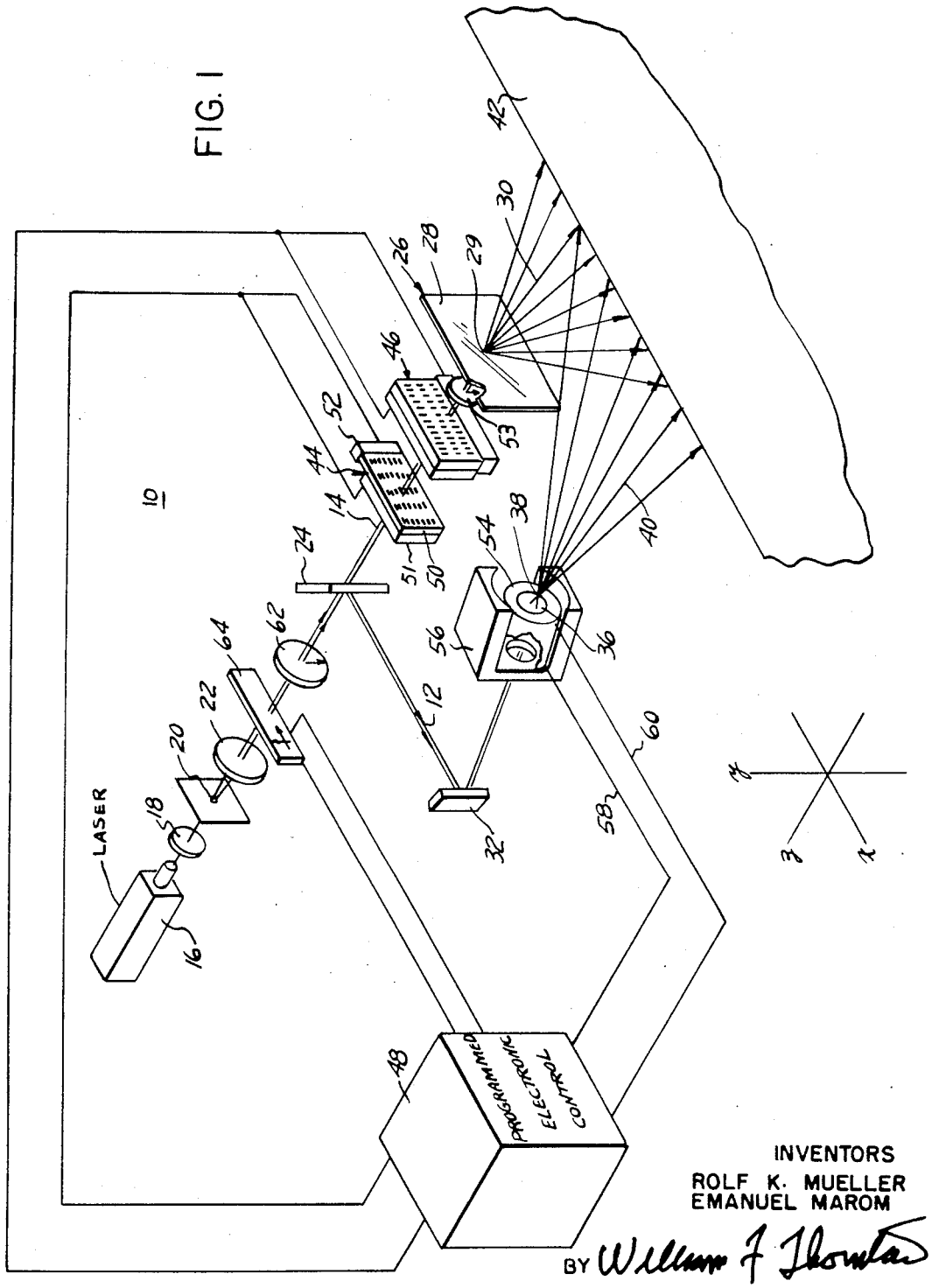

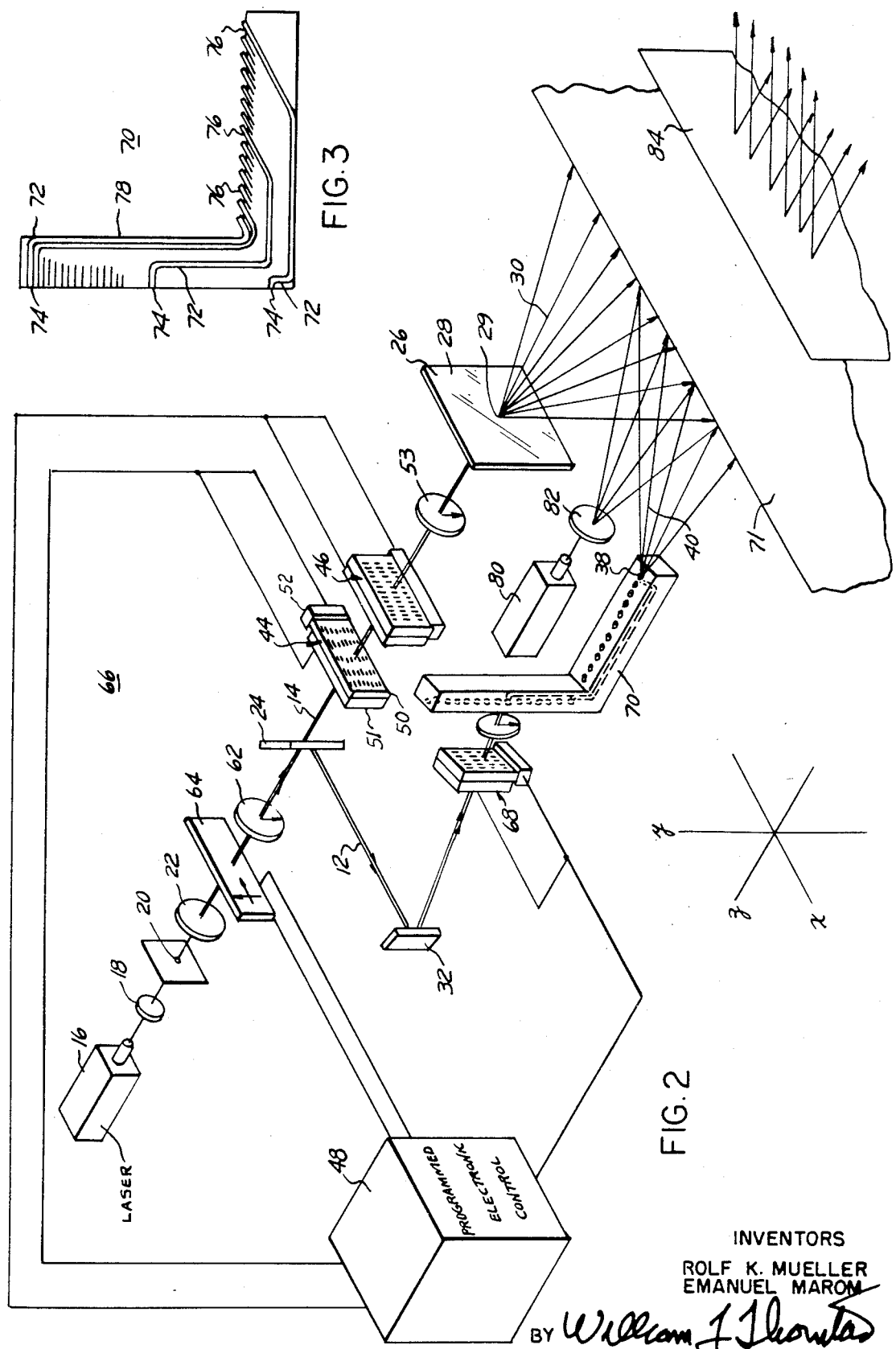

3,698,787

HOLOGRAM SYNTHESIS USING A DISPLACEABLE REFERENCE POINT SOURCE

BACKGROUND OF THE INVENTION

1. Field of the Invention

Holography.

2. Brief Description of the Prior Art

A hologram capable of producing an image of an object when properly processed, such as by being irradiated with a reconstruction signal, is conventionally formed by irradiating an object with a flood beam of coherent radiation such as laser light so that the flood beam is modulated by the object, and by directing a reference beam of coherent radiation to intersect and interfere with the modulated flood beam. A recording medium such as photographic film is placed in the region of interference to record the resulting hologram or interference pattern. A three-dimensional image can be produced by irradiating the recorded interference pattern with a reconstruction beam of coherent radiation.

Several attempts have been made to synthesize a hologram. One apparatus for synthesizing a hologram includes a cube array of radiation point sources for providing radiation directed to intersect and interfere with a reference beam to create a hologram. The profile of any desired object can be created by activating the proper sources of the cube array. The shortcomings of this design include the fact that it is difficult to construct a cube containing a sufficient number of individual point sources to produce a high resolution hologram. In addition, apparatus associated with each individual source, such as means for supplying power to that source, will interfere with the radiation transmitted from other sources in the neighborhood of that one source so that any signal transmitted from the cube array will be obstructed and somewhat distorted. It is also impossible to construct an embodiment of this device that will form a hologram using laser light since no apparatus currently exists for producing a large number of closely spaced, mutually coherent laser light sources which would be necessary to construct the cube array.

In a second known synthesizing device, the phase and amplitude of the signals that would arrive at each point on a recording surface from each point on a selected object are calculated in order to determine the nature of a hologram for producing an image of that object. Electrical signals having values determined by these calculations are then generated to produce a hologram. However, much extremely complex and costly apparatus must be used in order to produce a hologram in this manner. Sophisticated equations must be generated and solved many times by high-speed computing apparatus. Because of the large number of computations that must be performed, it is time consuming to produce a hologram in this manner even with high-speed computing apparatus. In addition, complex electronic apparatus is required to generate signals having the calculated values.

SUMMARY OF THE INVENTION

The subject invention comprises a method and apparatus for producing and recording a hologram by directing coherent wave energy from two sources to intersect and form an interference pattern on a recording medium. As used herein, a hologram comprises a two-dimensional pattern or information sequence representing such a pattern that includes the product of two wave fields, one of which is a reference wave field from a point source. The terms "source" and "point source" are used herein to refer to both real sources and point sources and to apparent sources and point sources. The sources are moved relative to the recording medium according to a predetermined program. The interference pattern produced by the intersection of radiation from the two sources changes as the positions of the two sources are changed. The interference pattern produced for each set of source positions comprises the portion of a conventional hologram produced by the interference of a reference signal and coherent wave energy from one point in the scene being recorded. As the sources are moved, the intensities of coherent wave energy are adjusted so that the intensity of the portion of the complex holographic pattern formed for any one set of positions corresponds to the intensity of the portion of the conventionally formed hologram produced by the interference of a reference signal and coherent wave energy from the point in the scene represented by that set of positions. The interference pattern produced for each set of source positions is recorded. The various recorded interference patterns are superimposed upon each other to form a complex pattern or hologram. The recorded hologram will produce an image of a relatively complex object or scene when mixed with a reconstruction signal.

Theoretically, it would be possible to synthetically produce a hologram using one fixed source of coherent radiation such as a fixed reference beam, and one movable source such as a movable point source that is capable of moving in all three directions in space. The point source would be moved to define the profile of the scene to be represented by the hologram. However, radiation must be projected and recorded from so many individual points in order to synthetically produce a hologram that it is practical to synthetically produce a hologram only when the point source can be moved at an extremely high speed. There is not apparatus presently available capable of moving a point source of wave energy in the $x$, $y$, and $z$ directions in space quickly enough for it to be practical to synthetically produce a hologram by moving a point source along the profile of the scene to be represented by the hologram. Therefore, in each embodiment illustrated herein, a hologram is produced by moving the locations of two apparent point sources of coherent wave energy. A first point source is moved from position to position in a plane and a second point source is moved along a line disposed at an angle to the plane. Apparatus is illustrated that will move a first point source from one position to another in a plane and a second point source from one position to another along a line more quickly than one source point can be moved from a first position to a second position displaced in the $x$, $y$, and $z$ directions from the first point.

When synthesizing a typical hologram, the location of the first point source moved in a plane is moved along a pattern that to a first approximation is the projection of the scene to be represented by the hologram onto a plane that is substantially parallel to a recording medium. To a first approximation, the motion of the second point along a line is exactly opposite to the component of motion perpendicular to the medium that would be provided for the first point if the second point were held fixed and the first point were moved in the x, y, and z directions. That is, if the first point were to be moved a given distance toward the recording medium if that first point were allowed to move in all directions in space and were not restricted to motion in a plane, the second point will be moved approximately that same distance away from the medium. The motion of both source points is described rigorously and mathematically hereinafter.

An image can be produced from a hologram synthesized by the method and apparatus of this invention using any known method or apparatus for producing an image from a hologram.

BRIEF DESCRIPTION OF THE DRAWINGS

Further objects, features and advantages of this invention, which are defined by the appended claims, will become apparent from a consideration of the following description, and the accompanying drawings in which:

FIG. 1 is an embodiment of this invention that includes variable means for deflecting a laser beam to move a first laser point source in a plane generally parallel to a recording film and means for moving a microscopic lens to move a second laser point source in a direction perpendicular to the plane;

FIG. 2 is a second embodiment of this invention that includes an acousto-optic deflector/modulator and an L-shaped fiberoptic transmitter for moving the second point source toward and away from the recording film so that both point sources can be moved without physically moving any element;

FIG. 3 is a more detailed view of the L-shaped fiberoptic light transmitting apparatus shown in FIG. 2.

DETAILED DESCRIPTION OF THE DRAWINGS

Figure 4:
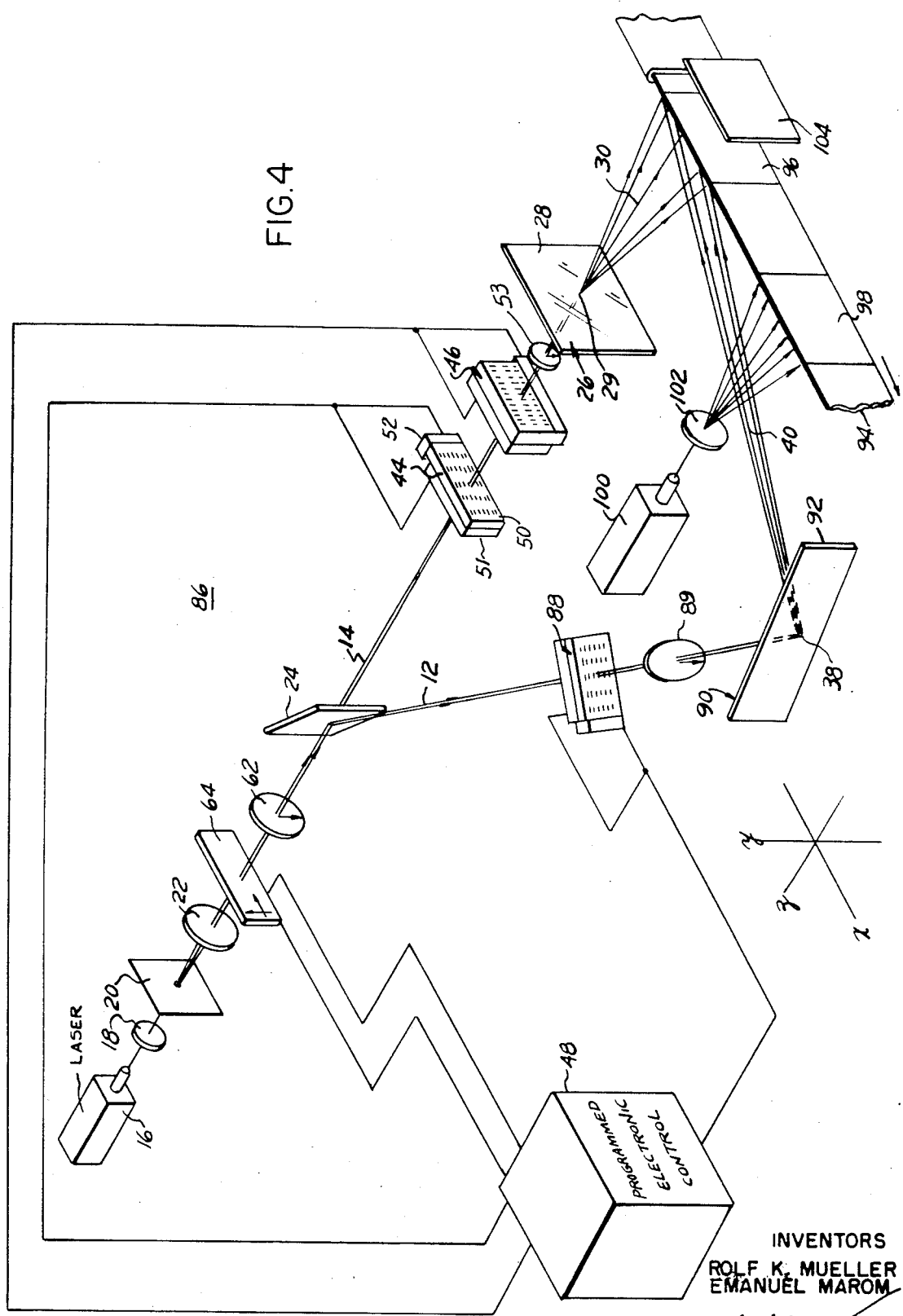
FIG. 4 is a third embodiment of this invention that includes a diffuse reflecting surface placed generally perpendicular to the recording film, means for projecting a laser beam onto that reflective surface to create a point source of laser radiation, and an acousto-optic deflector/modulator for deflecting the projecting laser beam to move the second point source toward and away from the recording film.

FIG. 1 illustrates a device 10 for synthetically producing and recording a hologram. The device 10 includes a conventional apparatus for producing two beams 12 and 14 of laser light; namely, a laser 16, a microscopic objective 18, a pin hole aperture 20, a collimating lens 22, and a beam splitter 24. Beam 14 is directed to strike a transparent glass sheet 26 which has a diffuse or ground surface 28 so that light striking any point 29 of the glass 26 will propagate from that point in a cone 30. Beam 12 is directed by mirror 32 through a microscopic objective lens 36. Lens 36 causes beam 12 to converge to a point 38 and propagate from that point in a cone 40. The two cones 30 and 40 intersect and interfere proximate a photographic film 42 which records the resulting interference pattern. Light appears to originate from points 29 and 38 when they are viewed from the film 42. These points are therefore apparent point sources. The intersection of two cones of light from two point sources creates an uncomplicated interference pattern. A record of a complex hologram or interference pattern that will produce a desired image is formed by moving the point sources 29 and 38 to a number of different positions and exposing the film 42 to the resulting interference pattern at each position. The interference pattern produced for each set of positions is superimposed upon the interference pattern produced for all the other positions to ultimately form a hologram on film 42.

Point source 29 is moved in the plane of glass 26 by two acoustooptic deflector/modulator combinations 44 and 46 which deflect laser beam 14 in response to signals received from a programmed electronic control 48. A deflector/modulator such as deflector/modulator 44 includes a crystal 50, generally cut to a rectangular shape and formed from a material such as quartz, a transducer 52 attached to the crystal 50, and a Pockel cell modulator 51. Transducer 52 is designed to receive an electric signal and cause a corresponding acoustic wave to propagate through the crystal 50. Beam 14 striking crystal 50 is deflected as it passes through that crystal by an amount dependent upon the frequency of the acoustic wave propagating through the crystal. The frequency of beam 14 is also shifted by a slight amount by the acoustic wave. This frequency shift must be compensated for in order to insure that the two point sources 29 and 38 are mutually coherent, and therefore, capable of producing an interference pattern. Compensation for this frequency shift is provided by modulating the intensity of the beam 14 at a frequency equal to the frequency of the acoustic wave that causes the deflection of that beam. This intensity modulation is provided by a Pockel cell 51 and an analyzer 53. Analyzer 53 has a predetermined direction of polarization and transmits only that component of beam 14 that is polarized in the predetermined direction. Pockel cell 51 is capable of changing the polarization of beam 14 according to the voltages of signals received from programmed control 48. Pockel cell 51 receives the same electric signals from control 48 that are transmitted to transducer 52. The frequency of these electric signals is equal to the frequency of the acoustic wave propagating in crystal 50. The direction of polarization of beam 14, and thus the intensity of that beam, is therefore changed at a frequency equal to the frequency of the deflecting acoustic wave. Deflector/modulator 44 is constructed to deflect beam 14 along the x-axis of the device 10, and deflector/modulator 46 is constructed to deflect that beam along the y-axis. The deflector/modulators 44 and 46 will place point source 29 at any desired position on the surface of glass 26. Glass 26 is disposed generally parallel to film 42 so that source 29 is moved in a plane generally parallel to the recording film by deflection of beam 14.

Point source 38 is moved in a direction generally perpendicular to to the plane of glass 26, or along the z-axis of the device 10. This is accomplished by moving the position of the objective lens 36 along that axis. Lens 36 is mounted in a piezoelectric cylinder 54 which is in turn mounted in a housing 56. Piezoelectric material expands and contracts in response to an applied voltage, with the direction of the expansion being parallel to the direction of the potential gradient across the piezoelectric material. The opposite ends of piezoelectric cylinder 54 are thus connected by lead lines 58 and 60 to the electronic control 48 so that a potential drop can be maintained and varied along the length of that cylinder. Voltages transmitted along the lines 58 and 60 cause cylinder 54 to expand and contact in a direction parallel to the z-axis of the device 10. Lens 36 and point 38 are thus moved toward and away from the recording film 42. Lens 36 is moved toward film 42 by transmitting signals along lines 58 and 60 to make the side nearest film 42 more positive with respect to the opposite side of that cylinder than had been the case previously. Similarly, lens 36 and point 38 are moved away from film 42 by making the side of cylinder 54 nearest film 42 more negative with respect to the opposite side of that cylinder than had been the case previously. A piezoelectric material expands and contracts only in the direction of the voltage gradient maintained across that material. Cylinder 54 will not expand in response to signals transmitted along the lines 58 and 60 in a direction that would change either its inner or outer diameters. There is, therefore, no problem involved in mounting and maintaining the lens 36 in cylinder 54 as shown.

The electronic control 48 is programmed to move source points 29 and 38 in sequence to various predetermined positions by controlling operation of the deflector/modulators 44 and 46 and by moving objective lens 36. The light from points 29 and 38 creates a different interference pattern for each of the predetermined positions of those points that represents a different point in the scene stored by the hologram being synthesized. The intensity of the light propagating from points 29 and 38 is controlled so that the interference pattern will have an intensity for each of the predetermined positions of points 29 and 38 that corresponds to the intensity of the points in the scene represented by each of those predetermined positions. The intensity of the two point sources 29 and 38 is varied during synthesization by a modulating apparatus comprising an analyzer 62 and a Pockel cell 64. These elements vary the intensity of the light sources 29 and 38 and operate in substantially the same manner as that described above for Pockel cell 51 and analyzer 53. Point sources 29 and 38 will be of a maximum brightness when the light which has passed through Pockel cell 64 is polarized parallel to the polarization direction of the analyzer 62. The intensities of light from these two point sources decrease as the angle between the direction of the polarization of analyzer 62 and the direction of polarization of the light which has passed through Pockel cell 64 is increased. In addition to controlling the brightness of point sources 29 and 38 at each of their predetermined positions, control 48 is also programmed to cause analyzer 62 and Pockel cell 64 to block all light as the point sources are moved from one position to another. That is, no light is transmitted as lens 36 is moved and as the state of deflector/modulators 44 and 46 is changed to alter the amount of deflection that will be provided by those elements. Thus, film 42 is not bleached by being constantly exposed as the points 29 and 38 are moved from one position to another.

In operation, to form a typical hologram the source points 29 and 38 will be placed in many, for example 1,000 to 10,000 different positions, and the film 42 will be exposed to light from each of those positions for a time interval typically on the order of 1/1,000 of a second. The number of different positions to which the two source points are moved, or in other words, the number of exposures that are superimposed on film 42, determine the resolution or detail of the image that will be formed by the synthesized hologram.

If the dimensions, and particularly the z ordinate dimension, of the object are small compared with the smallest distance between glass surface 28 and recording film 42, a hologram that will provide an image of a desired object can be produced by moving source point 29 substantially along the projection of that object onto plane of glass surface 28, and by moving point source 38 a distance substantially equal to and direction opposite to the z ordinate motion that source point 29 would undergo if it were allowed to move in all three directions and follow the profile of an object to be represented by the hologram. The hologram produced by moving the source points 29 and 38 in this manner will be as distortion free as a conventional hologram produced by reflecting laser light from an object and directing a reference beam to intersect and interfere with the reflected light. State-of-the-art techniques for removing distortions from a conventional hologram are known and can also be used to remove any distortions in a hologram produced by the device 10 for the above described small object.

However, if the object dimensions are not small compared with the smallest distance between glass surface 28 and film 42, any hologram of an object produced by moving source point 29 substantially along the projection of that object onto surface 28 and by moving source point 38 a distance equal to and a direction opposite the z ordinate motion that source point 29 would undergo if it were allowed to move along the profile of the object, will be more distorted than a conventionally constructed hologram. These distortions are eliminated when producing a hologram of a large object by altering the motion of source points 29 and 38 from that described above for small objects. The following mathematic derivation provides a precise definition of the motion of source points 29 and 38 for such a case.

In a scalar representation, coherent wave energy from a source point can be described by the formula:

$$a(x, y, z) = \frac{1}{R_a(x, y, z)} \exp\left\{i\frac{2\pi}{\lambda} R_a(x, y, z)\right\} \quad (1)$$

where:

$a(x,y,z)$ is the field amplitude at each point $(x,y,z)$ in space $R_a(x,y,z)$ is the distance $[(x-l_o)^2 + (y-m_o)^2 + (z-n_o)^2]^{1/2}$ $\lambda$ is the wavelength of the coherent wave $(l_o, m_o, n_o)$ = the $(x,y,z)$ coordinates of the point source $i = \sqrt{-1}$ $\pi$ = the ratio of the circumference of a circle to its diameter.

All defined quantities will be used consistently throughout and will not be redefined.

In calculating holographic patterns recorded on a medium such as a film, it is convenient to consider the film in the $(x,y)$ plane at $z = 0$. The amplitude $a(x,y)$ of a reference wave at any point $(x,y)$ on the film can thus be expressed:

$$a(x, y) = \frac{1}{R_a(x, y)} \exp\left\{i\frac{2\pi}{\lambda} R_a(x, y)\right\} \quad (2)$$

where:

$R_a(x,y)$ = the distance between the source point at $(l_o,m_o,n_o)$ and the point $(x,y)$ on the recording medium equals $[(x-l_o)^2 + (y-m_o)^2 + n_o^2]^{1/2}$ The interference pattern produced by the mixing of the reference $(a)$ and object $(b)$ beams is defined by the product of those beams in:

$$|a+b|^2 = aa^* + bb^* + ab^* + a^*b \quad (3)$$

where:

$a = a(x,y)$, the field amplitude at the point $(x,y)$ on the recording medium produced by a point source at $(l_o,m_o,n_o)$ $b = b(x,y)$, the field at the point $(x,y)$ on the recording medium produced by radiation from an object $|a+b|^2$ = the intensity of the sum of the two fields at a point $(x,y)$ on the recording medium $a^*$ and $b^*$ = the complex conjugates of $a$ and $b$, respectively.

The $a^*b$ term is the term that provides the real image component on formation of an image using the recorded hologram. The terms $aa^*$ and $bb^*$ do not represent image components, and $ab^*$ represents a virtual image component.

The object field amplitude may be expressed as:

$$b(x,y) = \sum_s b_s(x,y) \quad (4)$$

where:

$b_s(x,y)$ = the field due to the $s^{th}$ point on the object.

For two sources that are placed at a substantial distance from the recording medium, the $a^*b_s$ term in the intensity (see equation 3) can be expressed with the help of a standard approximation known as the Fresnel approximation, as:

$$a^*b_s = \frac{1}{r_0} \cdot \exp\left\{-i\frac{2\pi}{\lambda} r_0\right\} \cdot \exp\left\{-i\frac{\pi}{\lambda r_0}[(x-l_0)^2 + (y-m_0)^2]\right\} \cdot$$

$$\frac{1}{R_s} \exp\left\{i\frac{2\pi}{\lambda} R_s\right\} \exp\left\{i\frac{\pi}{\lambda R_s}[(x-l_s)^2 + (y-m_s)^2]\right\} \quad (5)$$

where:

$l_s, m_s, n_s$ = the $(x,y,z)$ coordinates of the $s^{th}$ point on the object;

$R_s$ = the absolute value of the $z$ component of the distance between the $s^{th}$ point on the object and the coordinate origin of the system, which is located on the recording medium; and $r_o$ = the absolute value of the $z$ component of the distance between the $a$ source point and the coordinate origin of the system, which is located on the recording medium.

A hologram can be generated using equation (5) by fixing the $a$ source in space by substituting fixed constant values for the $l_o$, $m_o$, and $r_o$ parameters representing the coordinates of the source $a$, and by changing the $l_s, m_s, n_s$ values (the $b_s$ source point coordinates) from one object point to another. This mathematic generation of a hologram corresponds to a physical generation of a hologram in which a reference source is maintained at one fixed position and a movable point source is moved in all three dimensions in space along the profile of a scene or object to be represented by the hologram.

The synthesizing device 10 does not include one fixed and one movable point source but instead includes two movable point sources 29 and 38. A hologram is generated by moving point source 29 in the plane defined by glass surface 28 and by moving point source 38 along a line that is perpendicular to the plane of source 29. In rewriting equation (5) to obtain the intensity term $(a_s^*b_s)$ generated by two movable point sources 29 and 38, the $(l_s, m_s, n_s)$ coordinates of the source points on an object are replaced by the $(l_s', m_s', R_o)$ coordinates of source point 29 on the plane of glass 26, and the fixed $n_o$ term representing the $z$ ordinate position of a fixed reference source is replaced by a variable $r_s$ representing the $z$ ordinate of point 38. This substitution provides:

$$a^*_s b_s = \frac{1}{r_s} \cdot \exp\left\{-i\frac{2\pi}{\lambda} r_s\right\} \cdot \exp\left\{-i\frac{\pi}{\lambda r_s}[(x-l_0)^2 + (y-m_0)^2]\right\} \cdot$$

$$\frac{1}{R_0} \exp\left\{i\frac{2\pi}{\lambda} R_0\right\} \exp\left\{\frac{i\pi}{\lambda R_0}[(x-l_s')^2 + (y-m_s')^2]\right\} \quad (6)$$

where:

$r_s$ = the absolute value of the $z$ ordinate of point source 38 for an object point $s$;

$R_o$ = the $z$ ordinate distance between the coordinate origin of the device 10 which is located on film 42 and the plane of glass surface 28 equals the $z$ ordinate of point 29; and $l_s', m_s'$ = the $(x,y)$ coordinates of source point 29 on surface 28 of glass 26 as measured from the coordinate origin of the device 10.

The proper positioning of the two movable point sources 29 and 38 to obtain the same holographic pattern that would be obtained with a first reference point source held in a fixed position and a second point source allowed to move in all three directions in space along the profile of a scene or object to be represented by the holographic pattern is determined by comparing equations (5) and (6) to obtain expressions that relate the coordinates of a point on an object $(l_s, m_s, n_s)$ to the coordinates of point 29 $(l_s', m_s', R_o)$ and the coordinates of a fixed reference point $(l_o, m_o, n_o)$ to the coordinates of point 38 $(l_o, m_o, r_s)$. Since $R_o, l_o,$ and $m_o$ are fixed constants for the device 10, expressions need only be obtained for $l_s', m_s'$, and $r_s$. A straightforward comparison of equations (5) and (6) provides:

$$l_s' = [R_o l_s + l_o(R_s - R_o)]/R_s \quad (7)$$

$$m_s' = [R_o m_s + m_o(R_s + R_o)]/R_s \quad (8)$$

$$r_s = (R_o R_s)/[R_o R_s + r_o(R_s - R_o)] r_o \quad (9)$$

where:

$R_s = |n_s|$ $r_o = |n_o|$

Equations (7), (8), and (9) are solved by the programmed electronic control 48 to obtain coordinate values of point sources 29 and 38 that correspond to the coordinate values of a fixed reference point and each point on an object. The coordinate values provided by equations (7), (8), and (9) provide an $a^*_rb_t$ value for equation (6) that is equivalent to the $a^*b_t$ value obtained with equation (5) for the corresponding fixed reference point and point on an object. And, the pattern produced by point sources 29 and 38 in the positions defined by the solutions to equations (7), (8), and (9) will be identical to the pattern produced by point sources at the corresponding fixed reference position and position on the object. A hologram is thus produced by repeatedly solving equations (7), (8), and (9) for preselected positions on the object to be represented by the hologram, and by moving points 29 and 38 according to the solutions obtained.

If the source points 29 and 38 are so close to the recording medium that the Fresnel approximation is inadequate, image aberrations arise. Identical aberrations occur in a conventional production of a hologram when the object is placed close to the recording film. Conventional techniques are known for eliminating these aberrations.

When the motion of point sources 29 and 38 is modified as indicated by the above derivation so that source 29 does not simply follow the profile of the object, the intensities of both sources 29 and 38 are each modified by a factor of $(r_sR_o/r_oR_s)^{1/2}$ from the intensities that they would have if source 29 were simply following the profile of the object. These intensity modifications are provided to sources 29 and 38 so that the fact that both sources are moved and one is not held in a fixed position while the other moves in all three directions in space to follow the profile of an object will not cause the illumination or brightness pattern of the image to be distorted.

FIG. 2 illustrates a second device 66 for synthetically producing a hologram that permits faster movement of source 38 than is possible with the device of FIG. 1. The source is moved simply by deflecting beam 12 in the device 66. It is not necessary to physically move any object such as a lens as is the case with the device 10 shown in FIG. 1. Source point 38 also can be moved a greater distance by the device of FIG. 2 than is possible with the device shown in FIG. 1. Device 66 differs from the apparatus 10 in that it includes an acousto-optic deflector/modulator 68, an analyzer 69 and an L-shaped fiberoptic assembly 70 for moving point source 38 toward and away from recording surface 71. Deflector/modulator 68 deflects beam 12 along the y-axis of apparatus 66. This y-axis deflection is translated into a movement of the source point 38 along the z-axis of apparatus 66 by the L-shaped fiberoptic assembly 70. A separate view of this assembly 70 is illustrated in FIG. 3. Apparatus 70 includes a plurality of fiberoptic light transmitters 72 arranged with their input ends 74 disposed along the y-axis of the device 66 and their output ends 76 disposed along the z-axis. The output ends 76 are bent slightly toward recording surface 71 so that light will be projected from those outputs onto the recording surface. A deflection of beam 12 by deflector/modulator 68 in the plus y direction, that is toward the top of column 78 of apparatus 70, moves source point 38 away from recording surface 71. A deflection toward the bottom of column 78 moves source point 38 toward recording surface 71.

The device 66 illustrated in FIG. 2 also differs from the device 10 illustrated in FIG. 1 in that the device 66 is designed to provide a real time, three-dimensional image for an observer. That is, a hologram of a scene and an image created from that hologram are formed at substantially the same time. In order to create this real time image, the photographic film 42 has been replaced with a photochromic material 71. An image for an observer is produced by illuminating the hologram recorded on the photochromic material 71 with visible laser light produced from a laser 80 and lens 82. The device 66 is constructed so that an observer will see only the three-dimensional image and will not see the coherent radiation used to create the hologram. In order to accomplish this, the writing laser 16 comprises coherent wave energy that is outside the visible spectrum, such as ultraviolet laser light. The reading laser 80 comprises visible laser light. The device 66 also includes a glass surface 84 which acts as a low frequency filter that absorbs ultraviolet light. Filter 84 thereby prevents any ultraviolet light from reaching an observer.

FIG. 4 illustrates apparatus 86 for synthetically producing a hologram that differs from the previously described devices in that it includes a deflector/modulator 88, an analyzer 89, and a mirror 90 having a ground or diffuse reflecting surface 92 for moving source point 38 toward and away from film 94. The beam splitter 24 is rotated in the device 86 from the position it occupied in the devices 10 and 66 to direct beam 16 more toward a recording film 94 than was the case with the previously described embodiments. That is, beam splitter 24 is positioned to direct beam 12 toward mirror surface 92, and mirror surface 92 is positioned generally parallel to recording film 94 and perpendicular to glass 26 so that beam 16 striking any point on the mirror surface will be reflected from that point to the recording film 94. A collimated beam of light striking a diffuse surface such as surface 92 of mirror 90 will be reflected from it in a cone instead of a beam. Beam 12 striking the diffuse, reflecting surface 92 is reflected from that surface in the cone 40 onto the film 94. Deflector/modulator 88 is constructed and positioned to deflect beam 16 in the $(x,z)$ plane to move point 38 toward and away from film 94.

Device 86 is also constructed to provide a real time, three-dimensional image for an observer. Recording film 94 comprises a moving, self-developing photographic film. Self-developing, photographic films are presently available that are capable of providing a three-dimensional image of a scene more quickly than that image can be provided with apparatus such as that shown in FIG. 2 that uses photochromic material. Points 29 and 38, which may comprise visible laser light, are moved to record a hologram on one frame of the film 94 at position 96. A motor (not shown) controlled by electronic control 48 moves film 94 so that a frame having a hologram recorded thereon is moved to position 98. Laser 100 and lens 102 provide visible laser light which is projected onto film 94 at position 98 to provide a three-dimensional image for an observer. An opaque shield 104 blocks the laser light from source points 29 and 38 used to record the hologram so that the observer will only see the three-dimensional image and will not see the laser light forming a hologram.

Having thus described several embodiments of this invention, a number of modifications will occur to those skilled in the art. For example, a hologram can be synthesized by moving a first point source on a plane, and a second point source along a line that is not normal to that plane. The second point is moved along a line normal to the plane of the first point in the embodiments illustrated herein to simplify the form of equations (7), (8), and (9). It would be obvious for one skilled in the art to modify those equations and their mathematic derivation provided herein to obtain related equations for defining the motion of a first point source on a more general surface, and a second point source along a line that is not normal to the plane. Or, as an example of another modification, a hologram could also be formed using radiation other than laser light, such as acoustic radiation. The interference pattern of acoustic energy from two source points can be recorded using standard electronic recording apparatus. Similarly, the patterns recorded for each set of positions of acoustic point sources can be superimposed to produce a hologram using standard electronic storage and mixing devices. These and other modifications to the three illustrated embodiments may be made without departing from the spirit of the invention and the scope of the appending claims.

Therefore, what is claimed is:

1. A method of synthetically producing a hologram representing a three-dimensional scene comprising the steps of:

producing two sources of mutually coherent wave energy directed to intersect and interfere with each other on a recording medium disposed at a fixed location;

moving one of said sources to different positions on a fixedly disposed surface so as to synthesize a particular first cross section of the scene to be represented, the other point source being disposed at one fixed position during synthesis of each portion of said first cross section so as to provide a reference beam;

repeating said step of moving said one point source on said fixedly disposed surface so as to synthesize different particular cross sections of said scene, the reference point source being moved along a line transverse to said surface to a different position for each particular cross section, said different positions being dependant upon the difference in location of said different particular cross sections in said scene from said first particular cross section so as to account for the different locations of said particular cross sections in said scene;

whereby a hologram is formed which when illuminated with light from a single fixed source will produce a three-dimensional image of said scene.

2. The method set forth in claim 1 in which:
said surface comprises a plane; and
said line is substantially normal to said plane.

3. The method set forth in claim 2 in which:
said one point source is moved from position to position substantially on the projection of the scene onto said plane; and
said other point source is displaced in one direction from said one fixed position to synthesize a cross section displaced in an opposite direction from said first cross section, the displacement of said other source from said one fixed position being proportional to the displacement of the cross section being synthesized from said first cross section.

4. The method set forth in claim 1 further including the step of calculating by machine the different positions of said sources using equations that relate the general mathematic expression for the interference pattern produced by wave energy from any one point in the scene interfering with wave energy from a fixed reference position and the general mathematic expression for the interference pattern produced by wave energy from any one point on said surface interfering with wave energy from any one point on said line.

5. The method set forth in claim 4 in which:
said mathematic expressions for said interference patterns comprise functions of the positions from which wave energy may propagate to form said interference patterns; and
said equations are obtained by comparing said mathematic expressions and thereby comprise general representations of a position on said surface and a position on said line from which propagating wave energy provides an interference pattern identical to the interference pattern provided by wave energy from a point in said scene interfering with wave energy from said fixed reference position.

6. The method set forth in claim 5 in which said surface is a plane, said line is normal to said plane, said sources are point sources, and said equations for calculating the coordinates $(l_s', m_s', R_o)$ of said one source and the coordinates $(l_o, m_o, r_o)$ of said other source are:

$$l_s' = [R_o l_s + l_o (R_s - R_o)]/R_s$$

$$m_s' = [R_o m_s + m_o (R_s - R_o)]/R_s$$

$$r_s = (R_o R_s)/[R_o R_s + r_o (R_s - R_o)] \, r_o$$

where:
the coordinate system is orthogonal to said plane and said perpendicular line,
$R_o$ = a fixed constant defining the position of said plane in the coordinate system
$l_o$ and $m_o$ = fixed constants defining the position of said line in the coordinate system
$(l_s, m_s, n_s)$ = the coordinates of a point s in the scene to be represented
$R_s = |n_s|$
$r_o$ = a fixed constant defining a predetermined reference position on said normal line.

7. The method set forth in claim 6 further including the step of providing both of said point sources with an intensity $I_s'$ defined by the equation:

$$I_s' = I_s \cdot (r_s R_o / r_o R_s)^{1/2}$$

where:
$I_s$ = the intensity that the point sources would have to produce a pattern that corresponds in intensity to the intensity of the point s in the scene when one point source is disposed in a fixed reference and the other is disposed at the point s in the scene, and all other symbols are as previously defined.

8. The method set forth in claim 1 further including the step of blocking the propagation of wave energy from said point sources during movement of said point sources from one fixed position to another to thereby prevent smearing of the hologram.

9. The method set forth in claim 1 in which:
said coherent wave energy of said two sources is outside the range of visible laser light;
said hologram is recorded on a photochromic surface responsive to said coherent wave energy; and
said photochromic surface is illuminated with visible laser light to form said three-dimensional image of said scene at substantially the same time as the formation of said hologram.

10. A system for utilizing two beams of unmodulated coherent wave energy to synthetically produce a hologram representing a three-dimensional scene comprising:
a fixedly disposed diffusive surface for receiving one of the beams and causing the coherent wave energy of said one beam to propagate in a first diverging wave energy distribution;
means for receiving the other of said beams and causing the coherent wave energy of said other beam to propagate in a second diverging wave energy distribution directed to intersect and interfere with said first diverging distribution;
means for moving the apex of said first diverging distribution on said surface and for moving the apex of said second diverging distribution along a line transverse to at least a portion of said surface to produce different interference patterns representing different points in the scene, the position of the point in the scene represented by interfering wave energy being moved along a particular cross section of the scene by movement of the apex of said first distribution on said surface, and being moved to different scene cross sections by movement of the apex of said second distribution along said line; and
a fixedly disposed recording means for receiving and forming a record of the superimposition of said different interference patterns to thereby form a hologram that will produce a three-dimensional image of said scene when illuminated with light from a single fixed source.

11. The synthesizing system of claim 10 in which:
said diffusive surface defines a plane;
said recording means comprises a planar recording surface substantially parallel to said diffusive surface; and
said line is substantially perpendicular to said plane; and
said moving means include:
means for moving the apex of said first diverging distribution substantially on the projection of the scene onto said diffusive surface; and
means for moving the apex of said second diverging distribution a distance along said perpendicular line substantially equal to any displacement parallel to said perpendicular line of a second position in the scene from a first position in the scene; and in a direction opposite to any displacement of said second position from said first position parallel to said perpendicular line when the apex of said first diverging distribution is moved substantially from the projection of said first position onto said plane to the projection of said second position onto said plane.

12. The synthesizing system of claim 10 in which said moving means includes an electronic control for controlling the movement of said apexes adapted to calculate the positions of the apexes using equations relating the general mathematic expression for the interference pattern produced by the wave energy from any fixed reference point interfering with wave energy from any point in the scene to the general mathematic expression for the interference pattern produced by wave energy propagating from any point on said surface interfering with wave energy propagating from any point on said line.

13. The synthesizing system of claim 12 in which:
said surface defines a plane;
said line is perpendicular to said plane; and
said electronic control provides said interference patterns representing different points in said scene by calculating the coordinate position $(l_s', m_s', R_o)$ of the apex of said first diverging distribution and the coordinate position $(l_o, m_o, r_o)$ of the apex of said second diverging distribution for each represented point in the scene using the three equations:

$$l_s' = [R_o l_s + l_o (R_s - R_o)]/R_s$$

$$m_s' = [R_o m_s + m_o (R_s - R_o)]/R_s$$

$$r_s = (R_o R_s)/[R_o R_s + r_o (R_s - R_o)] r_o$$

where:
the coordinate system is orthogonal to said plane and said perpendicular line,
$R_o$ = a fixed constant defining the position of said plane in the coordinate system
$l_o$ and $m_o$ = fixed constants defining the position of said line in the coordinate system
$(l_s, m_s, n_s)$ = the coordinates of a point s in the scene to be represented
$R_s = |n_s|$
$r_o$ = a fixed constant defining a predetermined reference position on said perpendicular line.

14. The synthesizing system of claim 10 further including means for controlling the intensity of said two diverging distributions of wave energy to cause each of said interference patterns to correspond in intensity to the intensity of the represented point in the scene.

15. The synthesizing system of claim 14 wherein said intensity controlling means is responsive to said programmed electronic control and provides both of said wave energy distributions with an intensity $I_s'$ for each of the different positions of the apexes of said distributions defined by the equation:

$$I_s' = I_s \cdot (r_s R_o / r_o R_s)^{1/2}$$

where:
$I_s$ = the intensity that said two distributions would possess to produce a pattern that corresponds in intensity to the intensity of the point s scene; and
all other symbols are as previously defined.

16. The synthesizing of claim 14 in which said intensity controlling means is constructed to block the propagation of coherent wave energy to said recording means during movement of said apexes in order to prevent the inclusion of unwanted signals in said hologram.

17. The synthesizing system of claim 10 further including means for mixing coherent wave energy with said hologram to form a three-dimensional image.

18. The synthesizing device set forth in claim 17 in which:
said beams of coherent wave energy having a frequency outside the range of visible laser light;
said recording means comprises a photochromic material sensitive to said coherent wave energy; and
said mixing means comprises means for illuminating said photochromic material with visible laser light as said interference patterns are superimposed on said photochromic material to form said three-dimensional image at substantially the same time as the formation of said hologram.

19. The synthesizing system of claim 10 in which:
said beams of coherent wave energy comprise beams of laser light;
said diffusive surface is at least partially transparent to laser light; and
said moving means include means for generating an acoustic wave to rapidly deflect said one beam and vary the position at which said one beam strikes said surface.

20. The synthesizing system of claim 17 in which:
said means for generating an acoustic wave to deflect said one beam also shifts the frequency of said one beam; and
the system further includes compensating means for shifting the frequency of at least one beam by an amount equal to the frequency shift provided by said deflecting means to maintain mutual coherence between said two interfering wave energy distributions.

21. The synthesizing system of claim 20 in which said compensating means comprises first polarizing means for polarizing wave energy of one beam in a predetermined direction, and second polarizing means for varying the direction of polarization of one beam at a frequency equal to the frequency of said acoustic wave.

22. The synthesizing system of claim 10 in which:
said means for receiving said other beam comprise means for focusing said other beam to a point and causing coherent wave energy from said other beam to propagate from said point in said second diverging distribution; and
said means for moving the apex of said second diverging distribution along a line comprise piezoelectric housing means for said focusing means, means for maintaining a potential gradient across said housing means, and means for varying said potential gradient to cause said housing means to expand and contract and thereby move said focusing means.

23. The synthesizing system of claim 10 in which:
said line along which the apex of said second distribution is moved comprises a first line;
said means for receiving said other beam comprise a plurality of transmitting elements, with the output end of each transmitting element disposed at a different position along said first line and the input end of each transmitting element disposed at a different position along a second line forming transverse to said first line; and
said means for moving the apex of said second diverging distribution along said first line comprises means for deflecting said second beam along said second line, said transmitting elements receiving said deflected beam and translating a beam deflection along said second line to a displacement of the apex of said second distribution along said first line.

24. The synthesizing system of claim 23 in which said beams of coherent wave energy comprise beams of laser light and said transmitting elements comprise fiberoptic transmitting elements.

25. The synthesizing system of claim 10 in which:
said means for receiving said other beam comprise means having a surface that reflects and diffuses said wave energy and causes wave energy striking a point on said surface to propagate from said surface in said second diverging distribution, said surface being disposed along said line; and
said means for moving the apex of said second diverging distribution along said line comprise means for deflecting said other beam to move the point at which said other beam strikes said reflective surface along said line.

* * * * *